US007158047B2

(12) United States Patent
Ushida

(10) Patent No.: US 7,158,047 B2
(45) Date of Patent: Jan. 2, 2007

(54) REMOTE CONTROL SYSTEM

(75) Inventor: Yoichi Ushida, Yamanashi (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 290 days.

(21) Appl. No.: 10/813,037

(22) Filed: Mar. 31, 2004

(65) Prior Publication Data

US 2005/0068151 A1 Mar. 31, 2005

(30) Foreign Application Priority Data

Sep. 25, 2003 (JP) ............................ 2003-332757

(51) Int. Cl.
*G08C 19/00* (2006.01)
*G08C 19/12* (2006.01)
*H04N 5/50* (2006.01)

(52) U.S. Cl. .......................... 340/825.72; 340/825.69; 341/175; 348/734

(58) Field of Classification Search ........... 340/825.72, 340/825.69
See application file for complete search history.

(56) References Cited

U.S. PATENT DOCUMENTS 6,104,334 A * 8/2000 Allport .................. 340/825.72
6,133,847 A * 10/2000 Yang ..................... 340/825.72
6,781,518 B1 * 8/2004 Hayes et al. ........... 340/825.72
6,791,467 B1 * 9/2004 Ben-Ze'ev .............. 340/825.72
6,914,551 B1 * 7/2005 Vidal .................... 340/825.24
6,989,763 B1 * 1/2006 Wall et al. ............. 340/825.72
7,046,161 B1 * 5/2006 Hayes ................... 340/825.69
2002/0140571 A1 * 10/2002 Hayes et al. ........... 340/825.72
2003/0189509 A1 * 10/2003 Hayes et al. ........... 340/825.69

FOREIGN PATENT DOCUMENTS

JP 2002-147839 5/2002

* cited by examiner

*Primary Examiner*—Wendy R. Garber
*Assistant Examiner*—Clara Yang
(74) *Attorney, Agent, or Firm*—Rabin & Berdo, P.C.

(57) ABSTRACT

The present invention provides a remote control system capable of controlling a number of devices on a network by one remote controller. A remote controller (10) requires a controlled device (20) defined as an object to be controlled to send display information. Thus, the display information stored in a ROM (21) of the controlled device (20) in advance is read and transmitted to the remote controller (10). The display information is described in a language such as HTLM, JAVA or the like. A browser on the remote controller (10) side displays a screen indicative of functions corresponding to a plurality of function keys (11) on a liquid crystal display (12). Thus, the function is selected based on the screen displayed on the liquid crystal display (12), and the function key (11) corresponding to the function is depressed, thereby making it possible to control the controlled device (20).

7 Claims, 7 Drawing Sheets

Fig.3

| FUNCTION KEY | DEVICE A (TELEVISION) | DEVICE B (REFRIGERATOR) |
|---|---|---|
| F1 | BS/TV CHANGEOVER | REFRIGERATOR/ FREEZER CHANGEOVER |
| F2 | INPUT CHANGEOVER | ILLUMINATION INSIDE |
| F3 | DUAL SOUND | VENTILATION |
| F4 | CHILD SCREEN DISPLAY | LOW-NOISE MODE |
| F5 | CH+ | TEMPERATURE+ |
| F6 | CH- | TEMPERATURE- |
| F7 | VOLUME+ | HUMIDITY+ |
| F8 | VOLUME- | HUMIDITY- |

| CONTROL CONTENTS | INSTRUCTION CODE | PARAMETER |
|---|---|---|
| NOP | 0x00 | — |
| Fn KEY DEPRESSED | 0xn0 | — |
| Fn KEY UNDEPRESSED | 0xn1 | — |
| Fn KEY BEING DEPRESSED | 0xn2 | 0xpp |
| Fm KEY DEPRESSED AFTER Fn KEY | 0xn3 | 0x0m |
| Fm KEY UNDEPRESSED AFTER Fn KEY | 0xn4 | 0x0m |
| ⋮ | ⋮ | ⋮ |
| DISPLAY INFORMATION REQUEST COMMAND | 0x0e | — |
| DEVICE LIST INFORMATION REQUEST COMMAND | 0x0f | — |

CONTROL INFORMATION

RESULT INFORMATION

PROTOCOL STACKS AND SOFTWARE STRUCTURES

OPERATION SEQUENCES

REMOTE CONTROL SYSTEM

BACKGROUND OF THE INVENTION

1. Field of the Invention

The present invention relates to a remote control system which controls devices connected to a wireless network.

2. Description of the Related Art

ZigBee is a new standard of a remote control system which aims for building/home automation through a low-cost and low-power device used for a few years with two AA alkaline batteries. In such ZigBee, a radio frequency of 2.4 GHz band is divided into 16 channels and used. 255 devices (devices to be controlled) can be connected per network. Data can be transferred at speeds up to 250 kbps within 30 m. Such ZigBee has the feature that although the rate of the data is low as compared with the recent wireless LAN or the like, power consumption can be reduced far low owing to ZigBee.

The standard of ZigBee is still in the draft stage. According to the draft, however, a network forms a PAN (Personal Area Network) wherein respective devices are connected in a tree structure with a coordinator as the center. Connections between the coordinator and the respective devices by radio are defined or provided such that the connections are performed by a CSMA-CA (Carrier Sense Multiple Access with Collision Avoidance) system through the use of a super frame having a frame beacon and time slots, and the establishment of their connections is carried out in accordance with processes at a network layer and a MAC (Machine Address Code) layer.

Specific example applications for ZigBee widely range from control of illumination and television to a home security system in homes. A network capable of controlling all by wireless can be constructed with respect to them. Thus, there is a possibility that an infrared interface such as a remote controller (hereinafter called “remocon”) for conventional television will be able to be perfectly substituted with one integrated network.

When a large number of devices are connected in practice, although the 255 devices can be connected per network in ZigBee, the individual execution of control on these devices becomes burdensome to ZigBee. As a simple method for controlling a device, may be mentioned, a method using a remocon dedicated to the device. Remocons for television, an air conditioner, a video cassette recorder, etc. are widely ubiquitous even at present. However, ZigBee is intended for all devices at home such as an illuminating device, a warning device, a refrigerator, a toy, a body of a personal computer and a mouse, a keyboard, etc. in addition to the television or the like. They have been diversified in function too. Thus, the individual fabrication of remocons for these devices could cause a situation flooded with the remocons throughout the house.

SUMMARY OF THE INVENTION

With the foregoing problems in view, the present invention provides a remote control system using a general-purpose remocon, which is capable of controlling a large number of devices on a network by one remocon in accordance with a wireless communication standard such as ZigBee.

According to a first invention, a remocon and a controlled device employed in a remote control system are respectively configured in the following manner. That is, the remocon includes an input unit consisting of a plurality of function keys, a liquid crystal display which displays functions associated with the function keys, a control information creating unit which performs a display of the liquid crystal display, based on a program described in a specific language and outputs control information about a corresponding function in accordance with a signal inputted from the corresponding function key, and a transmitting unit which incorporates the control information into a data frame and transmits the same via a radio channel. The controlled device includes a receiving unit which receives therein the data frame transmitted from the remocon, and a plurality of function execution units each of which decodes the control information in the data frame and executes a function designated by the remocon.

According to a second invention, a remocon and a controlled device employed in a remote control system are respectively configured in the following manner. That is, the remocon includes an input unit consisting of a plurality of function keys, a liquid crystal display having a function display region which displays functions associated with the function keys, a control information creating unit which performs a display of the liquid crystal display, based on a program described in a specific language and outputs control information about a corresponding function in accordance with a signal inputted from the corresponding function key, a remocon-side transmitting unit which incorporates the control information into a data frame and transmits the same via a radio channel, a remocon-side receiving unit which receives therein a data frame transmitted from a controlled device via the radio channel, and a display control unit which decodes result information lying in the data frame received by the remocon-side receiving unit and displays the same on the liquid crystal display. The controlled device includes a device-side receiving unit which receives therein a data frame transmitted from the remocon, a plurality of function execution units each of which decodes the control information in the data frame received by the device-side receiving unit and executes a function designated by the remocon, a result information creating unit which creates result information of the function executed based on the control information, and a device-side transmitting unit which incorporates the result information into a data frame and transmits the same to the remocon via a radio channel.

The above and other objects and novel features of the present invention will become more completely apparent from the following descriptions of preferred embodiments when the same is read with reference to the accompanying drawings. The drawings, however, are for the purpose of illustration only and by no means limitative of the invention.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is an explanatory diagram illustrating an example of the correspondence between function keys and controlled devices;

DETAILED DESCRIPTION OF THE INVENTION

A remocon whose control unit is equipped with function keys and a liquid crystal display is used to control a plurality of devices or apparatuses. The function keys are plural keys capable of changing functions assigned thereto in correspondence to an application program to be executed, as provided even in a keyboard of a personal computer. On the other hand, the liquid crystal display is provided adjacent to the function keys and displays the functions of the function keys set corresponding to the application program. Further, the remocon is provided with a browser for executing a program described in HTML (Hyper Text Markup Language) or JAVA and displaying it on the liquid crystal display. The remocon receives display information for displaying it on the liquid crystal display from a controlled device defined as a controlled object and displays the functions assigned to the function keys in correspondence to the controlled device.

<First Embodiment>

Figure 1:
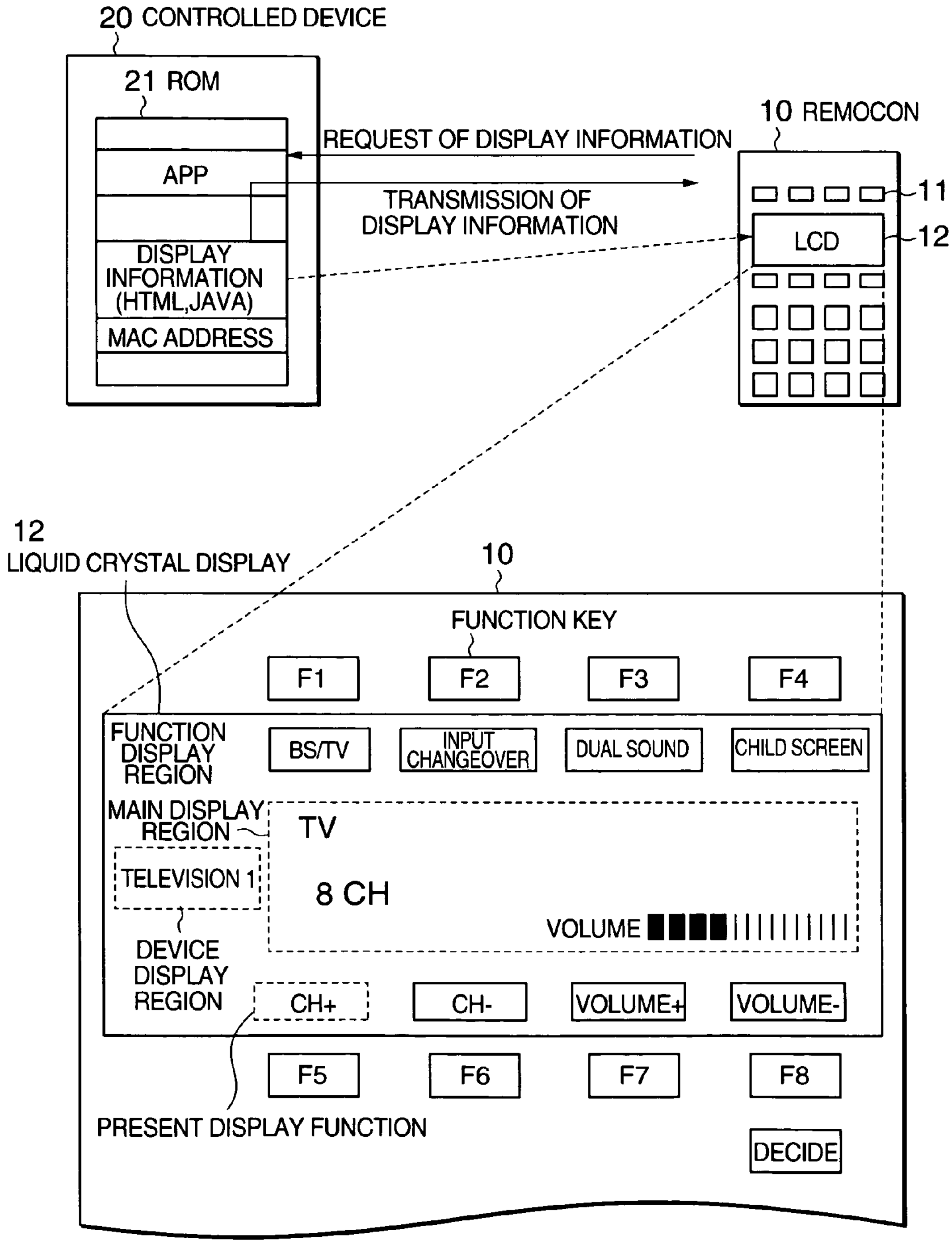
FIG. 1 is a schematic explanatory diagram of a remote control system showing a first embodiment of the present invention.

FIG. 1 is a schematic explanatory diagram of a remote control system showing a first embodiment of the present invention. The drawing particularly shows a method of describing how a remocon 10 captures or obtains display information about a control device 20 from the controlled device 20.

The remocon 10 is a palm-sized portable or handy-held terminal having a plurality of function keys 11 for operation and a liquid crystal display (LCD) 12 both disposed on its surface. Although not shown in the drawing, the remocon 10 accommodates or stores there inside an input unit (key IF) which detects a signal inputted through each of the function keys 11, an output unit (liquid crystal IF) which drives the liquid crystal display 12, a transmit-receive unit which transfers control information between the remocon 10 and the controlled device 20 by radio or wireless, and a controller which performs control in accordance with the control information between the remocon 10 and the controlled device 20, etc.

The controller comprises a processor, a memory that stores a control program and data therein, etc. The controller has the function (browser) of executing a program described in a language such as HTML or JAVA and displaying it on the liquid crystal display 12 in addition to control of the entire remocon 10.

On the other hand, the controlled device 20 (Television in the present embodiment) is equipped with a ROM (Read Only Memory) 21 which stores control information or the like for transmitting to the remocon 10, in addition to the function as a normal TV set. The ROM 21 stores therein display information in which interface information of the controlled device 20 is recorded, a MAC address corresponding to the number peculiar to the controlled device 20, etc. in addition to the application program. As to the display information, a program described in HTML or JAVA or in both languages is stored in a code form. Incidentally, the language used in the description of the display information is not necessarily limited to HTML or JAVA. If the remocon 10 is provided with its throughput capacity, then a language such as a CGI (Common Gateway Interface) language or the like may be adopted.

Further, although not shown in the figure, the controlled device 20 has a transmit-receive unit which performs the transfer of control information between the corresponding controlled device and the remocon 10 by wireless, and various function execution units (various IFs) for executing functions as the TV set in accordance with control information supplied from the remocon 10.

As part of the remocon 10 is represented in an enlarged form in FIG. 1, the plurality of function keys 11 serving as a control part of the remocon 10 are disposed in two rows along the upper and lower sides of the liquid crystal display 12. Incidentally, the number of the function keys 11 is not necessarily limited to eight but optional. Also the function keys 11 are optionally disposed, for example, they may be disposed along the four sides of the liquid crystal display 12, which are lying around the liquid crystal display 12.

In the present embodiment, the numbers of the function keys 11 are respectively set to F1 through F8. The function keys F1 through F8 are respectively assigned functions such as "BS/TV changeover", "input changeover", "dual voice changeover", "child screen display", "increase in channel number", "decrease in channel number", "increase in sound volume", and "decrease in sound volume". On the other hand, these functions of the function keys F1 through F8 are displayed in a function display region adjacent to the side surfaces of the function keys F1 through F8 within the screen of the liquid crystal display 12. Further, the name of a device to be controlled is displayed in a device display region on the left side within the screen of the liquid crystal display 12. The present controlled state of the controlled device is displayed in a main display region located in the center of the screen thereof.

In FIG. 1 by way of example, the device to be controlled is represented as "Television 1". The channel of the TV is selected and its channel number is represented as "8". Also the sound volume is displayed in the form of a bar graph and its scale extends to about ⅓. Further, a function display "CH+" on the lower left-hand section of the screen, which corresponds to the function key F5, is displayed in a dotted-line frame indicative of the present function display in order to represent a state in which the present control is increasing the channel number.

A description will be made of how the remocon 10 obtains display information about the controlled device 20 from the controlled device 20 in such a remote control system.

First, the connection to the coordinator (however, not shown in FIG. 1) functioning as the center of the PAN as described above is established as a premise of the operation of the remocon 10. Then, the remocon 10 communicates with the television corresponding to the controlled device 20 through the coordinator. When the remocon 10 has the function (such as storing of a list of all devices to be controlled in a nonvolatile memory) of the coordinator, the remocon 10 and the controlled device 20 perform direct communication therebetween. Since, however, there is a need to fabricate the remocon 10 at low cost, it is considered that the remocon 10 has less potential of including the function of the coordinator.

After the connection between the remocon 10 and the controlled device 20 has been established, the remocon 10 requires the controlled device 20 to provide its display information. The controlled device 20 having replied to such a demand executes the application program stored int the ROM 21 and thereby transmits the requested display information to the remocon 10. This transmission is performed in the form of a data frame. On the remote control 10 side, information necessary to control the controlled device 20 are displayed in the device display region, the function display region and the main display region of the liquid crystal display 12 on the basis of the received display information.

Figure 2:
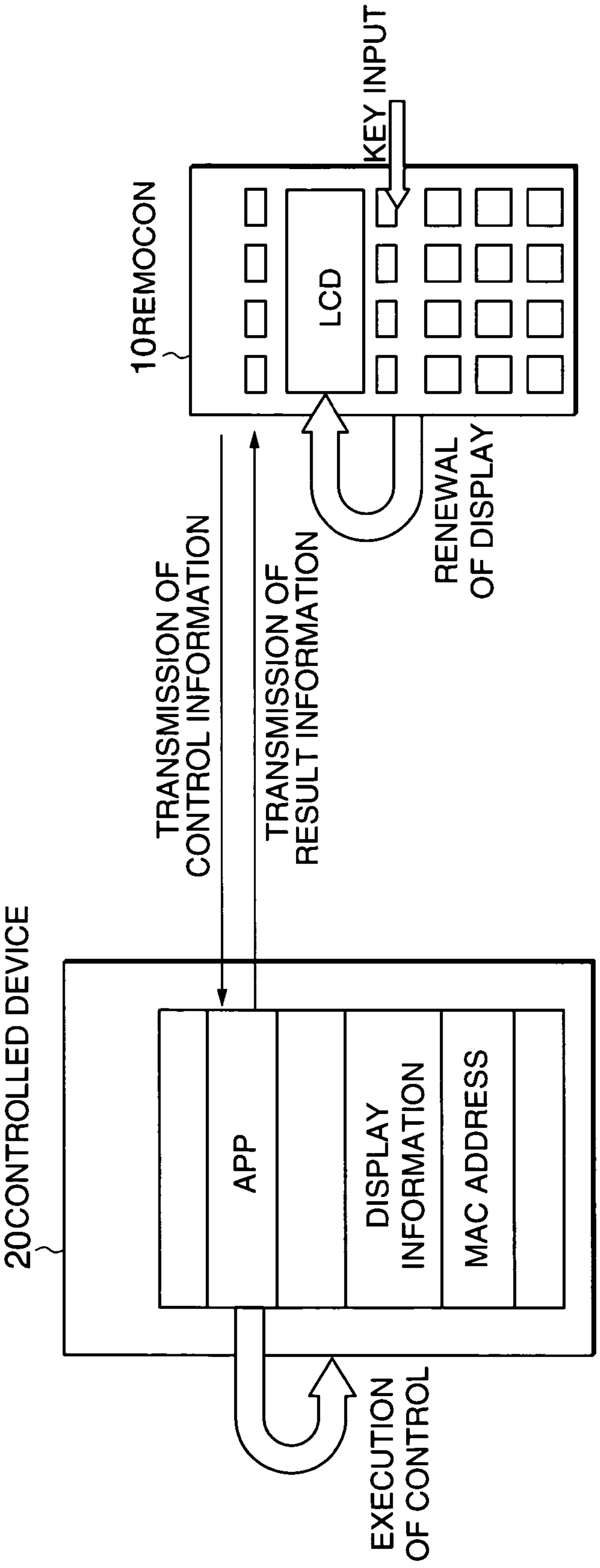
FIG. 2 is a schematic explanatory diagram of a device control method employed in the remote control system shown in FIG. 1.

FIG. 2 is a schematic explanatory diagram of a device control method employed in the remote control system shown in FIG. 1.

As described in FIG. 1, information necessary to control the controlled device 20 is first displayed on the liquid crystal display 12 of the remocon 10 in accordance with display information received from the controlled device 20.

When an operator depresses the function key 11 corresponding to a desired function on the remocon 10 side, the function of a function display region associated with the corresponding function key of the liquid crystal display 12 is selected. As a result, a frame that surrounds its function type is switched to the current function display indicated by a dotted line, whereby a display indicative of such a function being in execution at present is carried out.

On the other hand, control information is transmitted from the remocon 10 to the controlled device 20 in the form of a data frame under the depression of the function key. An application program of the controlled device 20 that has received the control information performs designated or specified control and creates result information about the result of its execution, which in turn is sent back to the remocon 10. As a result, the display is updated on the remocon 10 side and thereafter the present controlled state of the controlled device 20 is displayed on the liquid crystal display 12. Thus, the operator is capable of confirming whether desired control has been carried out at the controlled device 20.

FIG. 3 is an explanatory diagram showing an example of the correspondence between the function keys and controlled devices.

The respective function keys 11 are in a one-to-one correspondence with the function display region of the liquid crystal display 12 adjacent thereto. Depressing the key means that its corresponding function is selected and controlled. However, when the device to be controlled is switched and the name of the device displayed on the device display region of the liquid crystal display 12 is changed, the function display region is changed to a control function corresponding to the changed device.

Control functions corresponding to the television are shown in a first row of FIG. 3, and control functions corresponding to a refrigerator are shown in a second row by way of example, respectively. Thus, when the control device 20 is of the refrigerator, the function keys F1 through F8 are respectively assigned "refrigerator/freezer changeover", "illumination inside", "ventilation", "low-noise mode", "rise in set temperature", "drop in set temperature", "rise in set humidity, and "reduction in set humidity". Incidentally, a change in controlled object means that a destination or other to send control information from the remocon 10 is changed and a destination or other to send the result of control from the controlled device 20 is changed. Accordingly, a data frame to be transmitted includes an address for designating the opposing device.

Figure 4A:
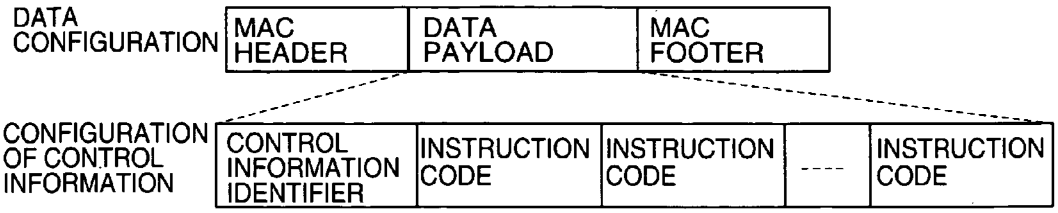
FIG. 4 is a configurational diagram of data transmitted and received between a remocon and a controlled device illustrated in FIG. 1.
Figure 4B:
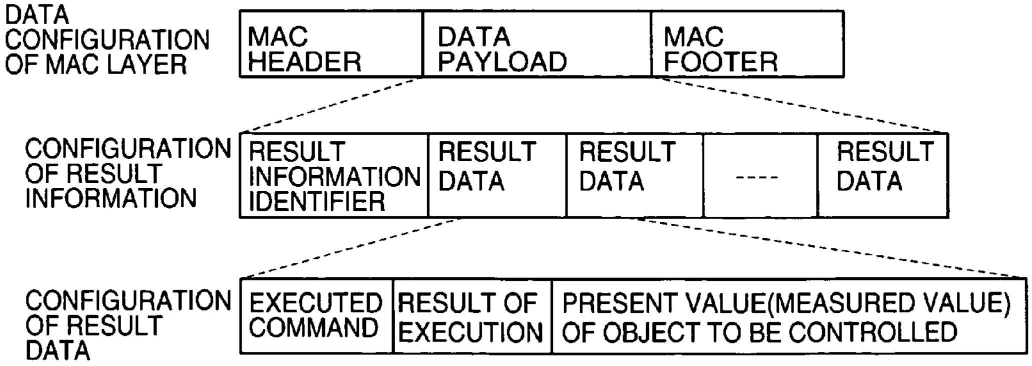

FIGS. 4(*a*) and 4(*b*) are respectively configurational diagrams of data transmitted/received between the remocon and the controlled device in FIG. 1, wherein FIG. 4(*a*) shows the format of control information transmitted from the remocon 10 to the controlled device 20, and FIG. 4(*b*) shows the format of result information transmitted from the controlled device 20 to the remocon 19.

As shown in FIG. 4(*a*), a MAC layer of data transmitted from the remocon 10 to the controlled device 20 comprises a header (MAC Header), a data payload (Data Payload) and a footer (MAC Footer). The header includes an address for specifying an opposing device. Device control commands indicative of the feature of the present invention are filled in the data payload. That is, the data payload takes a configuration wherein a control information identifier is placed at the head thereof and a plurality of device control commands are disposed in the form of instruction codes after the control information identifier.

The control information identifier makes use of a bit string of codes for distinguishing between general data and device control data, e.g., continuous "1" or "0", or their combinations. The plurality of command codes following the control information identifier are to be able to clearly express the number of instructions or the amount of data by the header and detect data's errors by the footer.

The control contents of the device control commands are related to the operations of the function keys 11. That is, since it is difficult to effect fine control on all kinds of controlled devices 20 as viewed from the remocon 10, the respective controlled devices 20 are respectively burdened with judgements each indicative of what control having been done. Since display information related to the respective controlled devices 20 are included in their corresponding controlled devices 20, the meaning of the operations of the function keys 11 has been determined and manifested in advance on the controlled device 20 side.

The contents of control that "an Fn key has been depressed" by way of example is represented as "0x50" (where Ox50 means 50 given in hexadecimal notation) in an instruction code when n=5. In the case of the device A (television) shown in FIG. 3, the contents thereof means an increase in channel number, whereas in the case of the device B (refrigerator), the contents thereof means a rise in set temperature. Incidentally, the instruction code is not limited to 1 byte but might be set to 2 bytes or more. In the case of the contents of control that "an Fn key is being depressed" by way of example, an instruction code corresponding to a first byte is represented as "Oxn2", and a code "Oxpp" corresponding to a second byte is represented as a parameter indicative of the time during which the Fn key is being depressed. An NOP (No Operation) is assigned an instruction code "OxOO".

On the other hand, a data configuration of a MAC layer associated with the result information transmitted from the controlled device 20 to the remocon 10 is also substantially similar to the MAC layer related to the control information as shown in FIG. 4(*b*).

That is, the MAC layer is made up of a header, a data payload ad a footer. Data of the result of execution, indicating the feature of the present invention are filled in the data payload. Namely, the payload has a configuration wherein a result information identifier for distinguishing between general data and the data about the result of execution is placed at the head thereof and a plurality of result data are placed after the result information identifier.

Each of the result data consists of an executed instruction, the result of execution of the instruction, and the present value (measured value) of its controlled object, etc. The result of execution of the instruction includes information which distinguishes between the successful completion of the instruction and its non-completion due to some causes. Thus, whether the successful completion of execution has been made, the present value and the like are updated and displayed on the remocon 10 side. When the controlled object is of the sound volume of the television, for example, the current value results in the present value (numerical value given in digital representation or scale of sound volume bar) of its sound volume. Incidentally, result data corresponding to "a display information request command" results in display information of the designated controlled device 20.

Figure 5A:
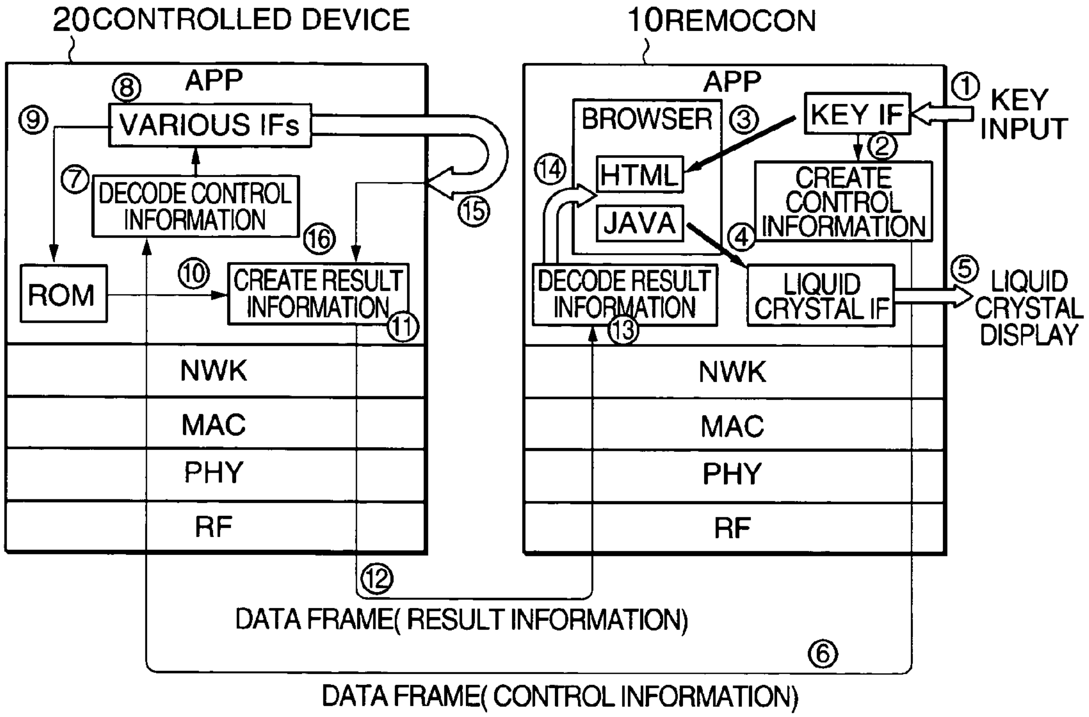
FIG. 5 is a diagram illustrating details of software structures shown in FIG. 1 and operation sequences thereof.
Figure 5B:
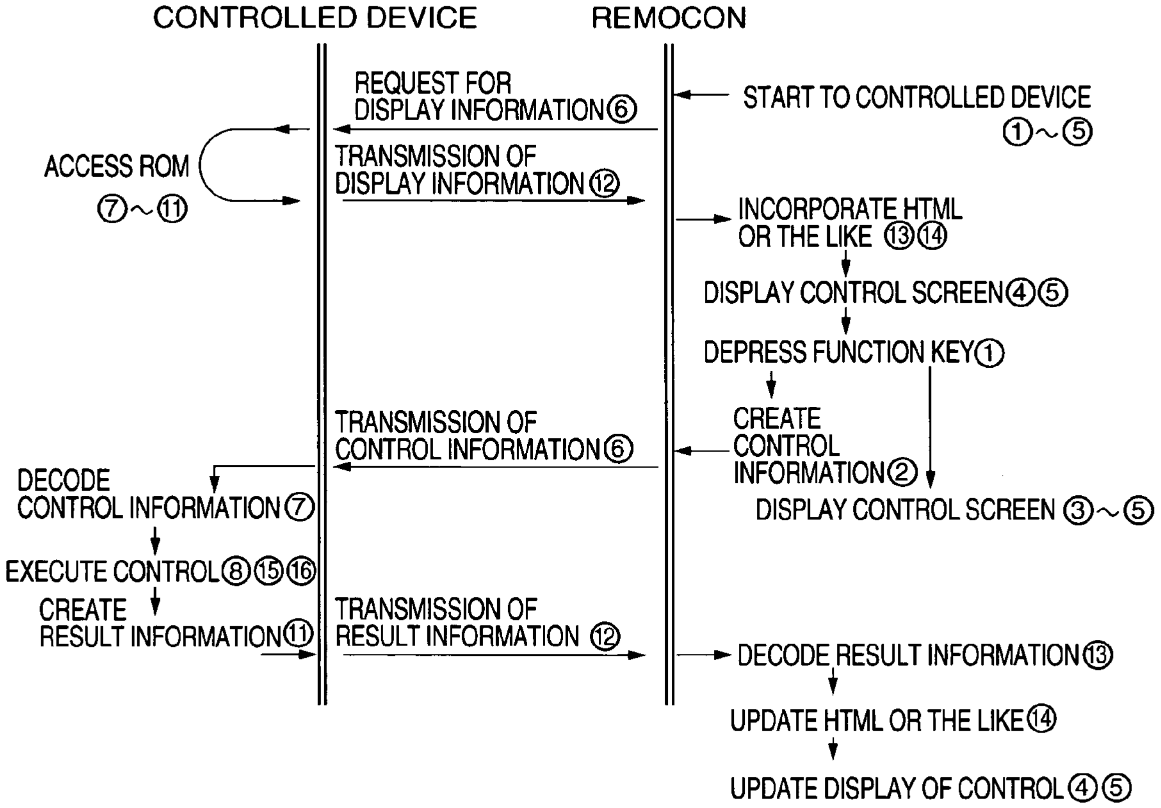

FIGS. 5(*a*) and 5(*b*) are diagrams showing details of software structures of the remote control system shown in FIG. 1 and operation sequences thereof, wherein FIG. 5(*a*) shows respective protocol stacks of the remocon 10 and the controlled device 20 and their software structures, and FIG. 5(*b*) shows their operation sequences, respectively.

As shown in FIG. 5(*a*), the remocon 10 and the controlled device 20 respectively have the same protocol stack structure. That is, an application layer (APP), a network layer (NWK), a MAC layer and a physical layer (PHY) are provided within each of the remocon and the controlled device in order from above, and hardware such as a high-frequency unit (RF) exists therebelow.

A browser and an application program having a program described in HTML or JAVA, of display information, which has been received from the controlled device 20, are placed in the application layer on the remote control 10 side. Then, the browser performs a display placed under the program described in HTML or the like. Further, a control information creating program for controlling the controlled device 20, and a result information decoding program for decoding result information received from the controlled device 20 are placed in the application layer. The control information creating program and the like may take forms that respectively exist independently and are available from the application program or may take forms formed as ones integral with the application program.

On the other hand, a control information decoding program for decoding the control information sent from the remocon 10 side, and a result information creating program for recording and arranging the result of execution of control are placed in an application layer on the controlled device 20 side. The control information decoding program and the like may take forms that respectively exist independently and are available from the application program or may take forms formed as ones integral with the application program.

The operation sequences based on software shown in FIG. 5(*a*) will next be explained with reference to FIG. 5(*b*). Incidentally, the sequence numbers (1) through (16) to be described inside the parentheses in the following description are identical to the numbers in FIGS. 5(*a*) and 5(*b*).

First, when the remocon 10 is used to control the controlled device 20, it is necessary to acquire display information of the controlled device 20. Therefore, an operator depresses the corresponding function key 11 of the remocon 10 or other key to specify a desired device to be controlled from various devices displayed on the liquid crystal display 12 of the remocon 10 ((1) through (5)). A key input (1) is detected by a key interface (key IF) so that the control information creating program is started ((2)).

Thus, the control information creating program generates an instruction (display information request command in FIG. 4(*a*)) for requiring the designated controlled device 20 to send its display information. The instruction created by the control information creating program is transmitted to the controlled device 20 as a data payload on a data frame ((6)).

The application layer on the controlled device 20 side having received the control information sent from the remocon 10 confirms the contents of the instruction in accordance with the control information decoding program and accesses the ROM 21 to read display information ((7) through (10)). Further, the application layer on the controlled device 20 side instructs the result information creating program to create result information containing display information for sending to the remocon 10 ((11)). Thus, the result information created by the result information creating program is transmitted to the remocon 10 side as a data payload on a data frame ((12)).

The application layer of the remocon 10 having received the result information fetches the display information through the use of the result information decoding program ((13)) and updates a program described in HTML or passes the display information to a program described in JAVA ((14)). Thus, the display contents of the liquid crystal display 12 is updated through a liquid crystal interface (liquid crystal IF) ((4) and (5)).

Thus, even if the controlled device 20 is one of any type, display information pre-determined according to each device is fetched and thereby a control screen can be displayed on the liquid crystal display 12 of the remocon 10 in real time. Incidentally, although there is a need to at least fix the correspondence of the respective function keys 11 (F1 through F8) and the display contents of the function display region of the liquid crystal display 12 to the display information, the contents of other control screen is optional.

A description will next be made of the operation of the controlled device 20 at the time that one function key 11 is depressed to control the controlled device 20 in accordance with a control screen displayed on the liquid crystal display 12 of the remocon 10 by the above operation.

When a given function key 11 is depressed, a signal inputted by its depression is passed to the control information creating program via the key interface so that the corresponding command is issued ((1) and (2)). The command is transmitted to the controlled device 20 as a data payload on a data frame ((6)). The application layer of the remocon 10 confirms the fact that the specific function key 11 has been depressed, via the key interface. In order to update the display contents of the function display region of the liquid crystal display 12, which corresponds to the function key 11, the application layer thereof updates a program described in HTML or passes display information to a program described in JAVA ((3) through (5)). Thus, the display contents of the liquid crystal display 12 is renewed and a frame or closing line of the function corresponding to the depressed function key is displayed by a dotted line.

On the other hand, the application layer of the controlled device 20 having received the control information from the remocon 10 confirms the control contents thereof through the control information decoding program and executes necessary control via various interfaces (various IFs) ((7), (8) and (15)). After execution of the necessary control by the various interfaces, the application layer collects information about the result of its execution and passes it to the result information creating program ((16)). The result information creating program combines data about the result of execution into a fixed format and transmits it to the remocon 10 as a data payload on a data frame ((11) and (12)).

The result information decoding program of the remocon 10 having received the result information confirms that the data contains the result information distinguished from general data, and passes the result information to the application layer ((13) and (14)). Afterwards, in order to display the result of execution on its corresponding main display region of the liquid crystal display 12, the application layer of the remocon 10 updates a program described in HTML or passes its display information to a program described in JAVA ((4) and (5)). Thus, the main display region of the liquid crystal display 12 is updated and thereby a control screen indicative of the result of execution of the controlled device 20 is displayed.

As described above, the remote control system according to the first embodiment is capable of displaying the control screen for the controlled device 20 on the liquid crystal display 12 of the remocon 10 even if the controlled device 20 is any type, and performing its control through the use of the function keys 11 adjacent thereto. Further, the remote control system is able to confirm the result of execution through the same liquid crystal display 12. Thus, the remote control system has the advantages that there is no need to prepare dedicated remocons every plural controlled devices 20 and one remocon 10 is capable of selectively controlling these plural controlled devices 20.

<Second Embodiment>

Although a description has been made of the first embodiment from the state in which the television has already been selected as the controlled device 20, there is a need to practically select a device to be controlled from a plurality of devices prior to the display of display information of the selected device.

Figure 6:
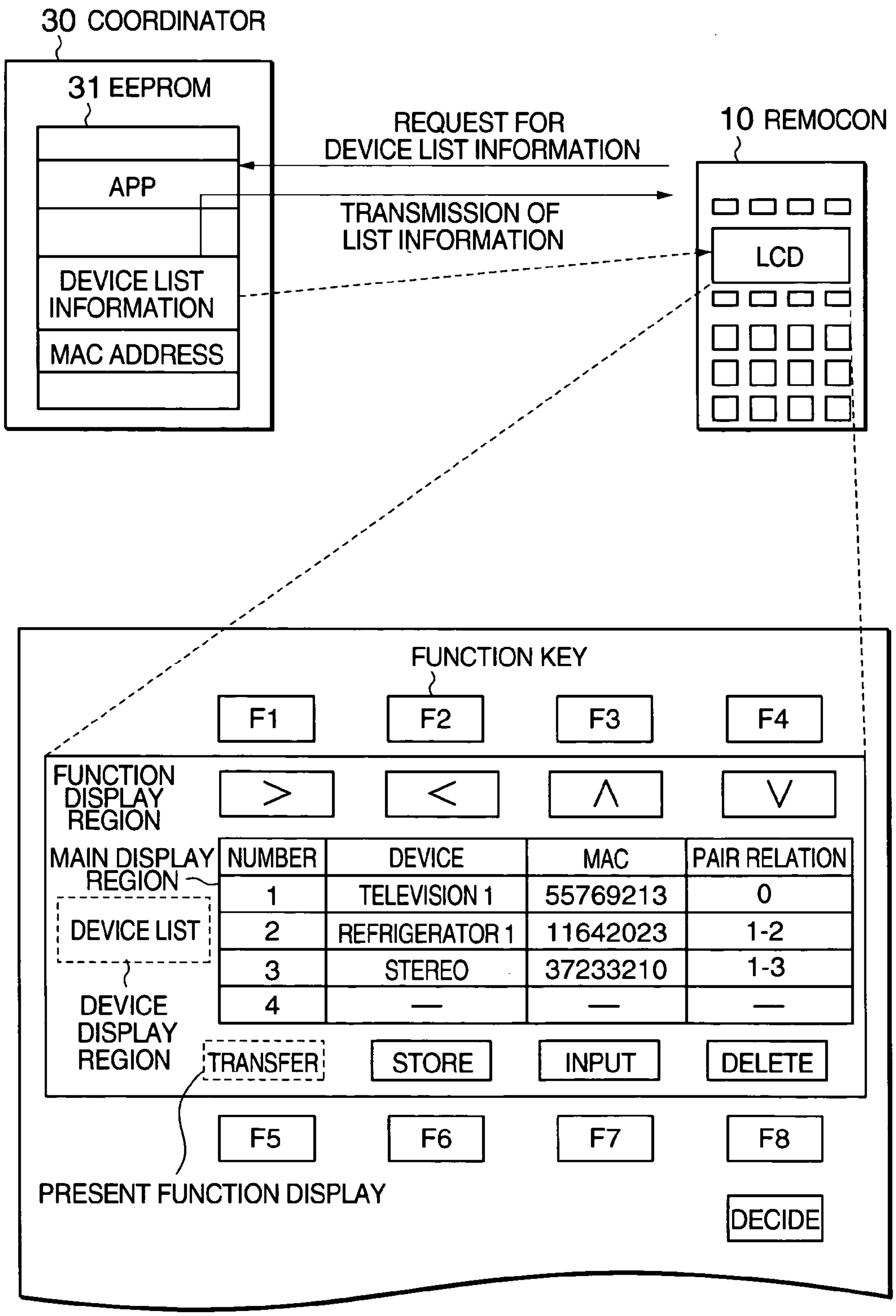
FIG. 6 is a schematic explanatory diagram of a remote control system showing a second embodiment of the present invention.

FIG. 6 is a schematic explanatory diagram of a remote control system showing a second embodiment of the present invention. The drawing particularly shows a method of describing how a remocon 10 acquires device list information from a coordinator 30 and displays it. In the present embodiment, the device list information indicates a list of coordinators and various controlled devices contained in a PAN constituting the remote control system, and contains a MAC address, and information about pair and group relations.

As shown in FIG. 6, the remocon 10 requires the coordinator 30 to send device list information held in the coordinator 30 by use of a device list information request command (see FIG. 4(*a*)). The coordinator 30 having received its request reads device list information stored in an EEPROM 31 and transmits the list information to the remocon 10. In the remocon 10 having received the list information, the contents of the list information is displayed on the liquid crystal display 12. An operation sequence at this time is similar to one for the coordinator 30 with which the controlled device 20 shown in FIG. 5 is substituted.

Thus, a liquid crystal display screen for a device list illustrated in an enlarged form in FIG. 6 is obtained.

When a specific device is regarded as an object to be controlled by the remocon 10, it can be specified or designated on the device list displayed in a main display region of the liquid crystal display 12. After it designation, a display information request command for the designated device is issued under the depression of a specific function key 11. When the requested display information is captured, the name of the designated device is displayed on a device display region of the liquid crystal display 12. Now consider FIG. 6 by way of example. When the function keys 11 (F1 through F4) are operated to designate a “television 1” lying in a first row in a device column, and a “decision” key is depressed and a predetermined operation is done to capture display information, a control screen related to the “television 1” is displayed as illustrated in the remocon 10 in FIG. 1.

According to the second embodiment as described above, an advantage is brought about in that since the remocon 10 is capable of obtaining the device list information from the coordinator 30 and displaying the device list on the liquid crystal display 12, the device to be controlled can be easily specified, thereby improving the operationality of the remocon 10.

Incidentally, the embodiments described above are for the purpose of clarification of the technical contents of the present invention only. The present invention should not be narrowly interpreted with a limitation to only the above embodiments. The present invention can be changed in various ways and carried out within the scope described in claims of the invention.

What is claimed is:

1. A remote control system comprising:

a remote controller including, an input unit consisting of a plurality of function keys;

a liquid crystal display that displays functions associated with the function keys and that displays device list information;

a control information creating unit that performs a display of the liquid crystal display, based on a program described in a specific language and outputs control information about a corresponding function in accordance with a signal inputted from the corresponding function key;

a remote controller-side receiving unit that receives the device list information; and a remote controller-side transmitting unit that incorporates a device list information request command and the control information into one or more data frames and transmits the same via a radio channel;

a coordinator, distinct from any device controlled by the remote controller, including:

a coordinator receiving unit that receives therein the device list information request command transmitted from the remote controller via the radio channel; and a coordinator transmitting unit that transmits the device list information to the remote controller in response to the device list information request command; and a controlled device including, a device-side receiving unit that receives therein the data frame transmitted from the remote controller; and a plurality of function execution units each of which decodes the control information in the data frame and executes a function designated by the remote controller.

2. A remote control system according to claim 1, wherein the specific language is HTML or JAVA (registered trademark of US Sun Microsystems, Inc.), or a combination thereof.

3. A remote control system comprising:

a remote controller including, an input unit consisting of a plurality of function keys;

a liquid crystal display that displays functions associated with the function keys and that displays device list information;

a control information creating unit that performs a display of the liquid crystal display, based on a program described in a specific language and outputs control information about a corresponding function in accordance with a signal inputted from the corresponding function key;

a remote controller-side transmitting unit that incorporates a device list information request command and the control information into one or more data frames and transmits the same via a radio channel;

a remote controller-side receiving unit that receives therein a data frame transmitted from a controlled device via the radio channel and receives the device list information; and a display control unit that decodes result information lying in the data frame received by the remote controller-side receiving unit and displays the same on the liquid crystal display;

a coordinator, distinct from any device controlled by the remote controller, including:

a coordinator receiving unit that receives therein the device list information request command transmitted from the remote controller via the radio channel; and a coordinator transmitting unit that transmits the device list information to the remote controller in response to the device list information request command; and a controlled device including, a device-side receiving unit that receives therein a data frame transmitted from the remote controller;

a plurality of function execution units each of which decodes the control information in the data frame received by the device-side receiving unit and executes a function designated by the remote controller;

a result information creating unit that creates result information of the function executed based on the control information; and a device-side transmitting unit that incorporates the result information into a data frame and transmits the same to the remote controller via a radio channel.

4. A remote control system according to claim 3, wherein the specific language is HTML or JAVA (registered trademark of US Sun Microsystems, Inc.), or a combination thereof.

5. A remote control system according to claim 3, wherein the control information creating unit of the remote controller outputs a display information request command for requiring the controlled device to send display information displayed on the liquid crystal display in correspondence to the plurality of function keys in addition to the control information, and the controlled device has a nonvolatile memory which stores therein the display information transmitted corresponding to the display information request command supplied from the remote controller.

6. A remote control system according to claim 3, wherein the control information consists of a control information identifier for identifying the control information and a single or plural instruction codes for executing each individual function of the controlled device, and the instruction codes respectively have the contents related to the operations of the function keys.

7. A remote control system according to claim 3, wherein the result information comprises a result information identifier for identifying the result information and result data indicative of the result of execution of each function of the controlled device, and the result data has the contents related to the present value of an object to be controlled.

* * * * *